(12) United States Patent
Shaner

(10) Patent No.: US 6,406,233 B1
(45) Date of Patent: Jun. 18, 2002

(54) ANCHOR FOR USE WITH METAL STUDS

(75) Inventor: Brenten P. Shaner, 625 Harold St., Eugene, OR (US) 97402

(73) Assignee: Brenten P. Shaner, Eugene, OR (US)

( * ) Notice: Subject to any disclaimer, the term of this patent is extended or adjusted under 35 U.S.C. 154(b) by 0 days.

(21) Appl. No.: 09/721,538

(22) Filed: Nov. 20, 2000

(51) Int. Cl.$^7$ .................. F16B 13/04; F16B 37/04
(52) U.S. Cl. .................. 411/21; 411/182; 411/508; 411/913
(58) Field of Search .................. 411/21, 182, 338, 411/339, 508, 509, 510, 913

(56) References Cited

U.S. PATENT DOCUMENTS

| | | |
|---|---|---|
| 2,685,877 A | 8/1954 | Dobelle |
| 3,352,195 A * | 11/1967 | Fisher ............... 411/338 X |
| 3,669,481 A | 6/1972 | Bergmann |
| 4,074,888 A | 2/1978 | Garner |
| 4,181,061 A | 1/1980 | McSherry |
| 4,358,234 A * | 11/1982 | Takagawa et al. ...... 411/182 X |
| 4,553,889 A | 11/1985 | Le Dantec et al. |
| 4,770,583 A | 9/1988 | Lindberg |
| 4,875,815 A | 10/1989 | Phillips |
| 5,173,025 A * | 12/1992 | Asami ................ 411/182 X |
| 5,624,130 A * | 4/1997 | Ricks ................ 411/508 X |
| 5,632,584 A * | 5/1997 | Acevedo .............. 411/508 X |

* cited by examiner

*Primary Examiner*—Neill Wilson
(74) *Attorney, Agent, or Firm*—Robert E. Howard

(57) ABSTRACT

An anchor for attaching objects to a metal stud having a stud wall with inner and outer faces. The anchor has a cylindrical body having an inner end that is conical and an opening at its mid-portion. A plurality of fins extend from the anchor body adjacent the outer end, adapted to abut the outer face of a metal stud. A threaded bore extends along the longitudinal axis of the anchor body. A stud wedge is attached at its inner end to the anchor body by hinge means. The hinge means allow the stud wedge to be depressed into the opening during insertion of the anchor through a hole drilled through the wall of a metal stud, but forces the stud wedge upwardly after insertion of the anchor through the stud to lock the back side of the wedge against the inner face of the stud.

15 Claims, 3 Drawing Sheets

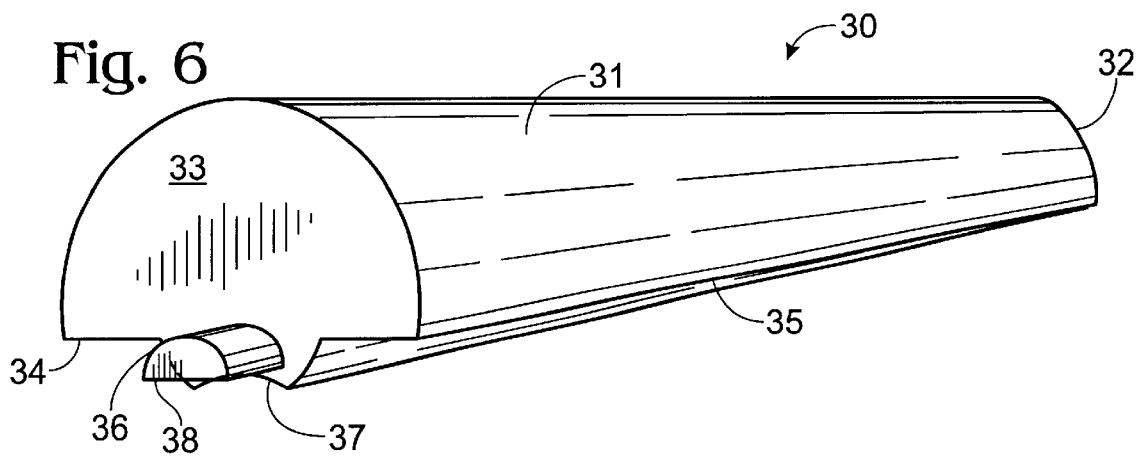
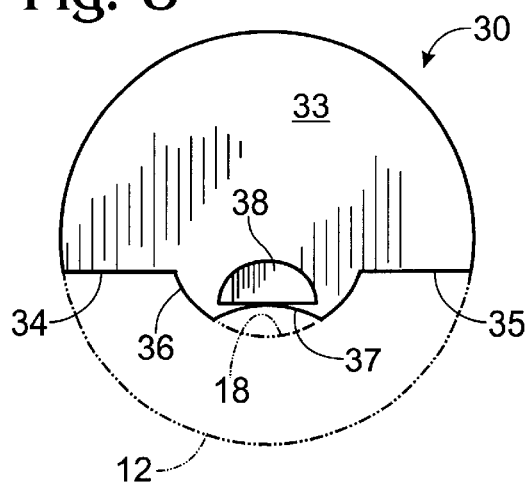
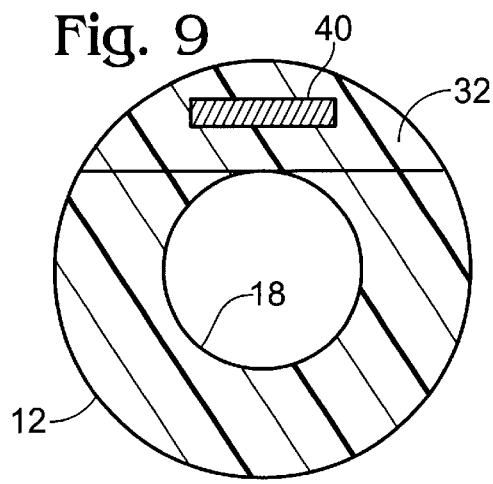

ANCHOR FOR USE WITH METAL STUDS

BACKGROUND OF THE INVENTION

This invention relates to an anchor for attaching objects to metal studs covered with sheetrock or drywall.

The interior walls of residential buildings typically are formed of wooden studs overlaid with sheetrock or drywall. With such construction nails or screws can be secured to the wooden studs for the purpose of hanging pictures, mirrors, cabinets, etc.

More recently the use of metal studs as replacements for wooden studs for wall construction in residential structures has been increasing. Metal studs have a number of advantages over wooden studs, including resistance to rot, fire resistance, economics, environmental considerations, etc.

However, one problem with metal studs is that nails or screws cannot be permanently secured to them for hanging objects that are too heavy to hang from drywall anchors as they work loose. For very heavy items, such as cabinets, cupboards, and shelving, contractors currently have to first secure a wooden backing member to the steel studs prior to installing the drywall. Applying such backing members is expensive and time consuming.

SUMMARY OF THE INVENTION

It is an object of the present invention to provide an anchor member for hanging objects which can be easily secured to metal studs after drywall has been installed over the studs.

BRIEF DESCRIPTION OF THE DRAWINGS

FIG. 6 is a perspective view of the stud wedge of the anchor of the present invention;

FIG. 8 is an end view of the stud wedge of the anchor of the present invention; and FIG. 9 is a cross-sectional view of the anchor of the present invention taken along line 9—9 of FIG. 1.

DESCRIPTION OF PREFERRED EMBODIMENTS

Figure 1:
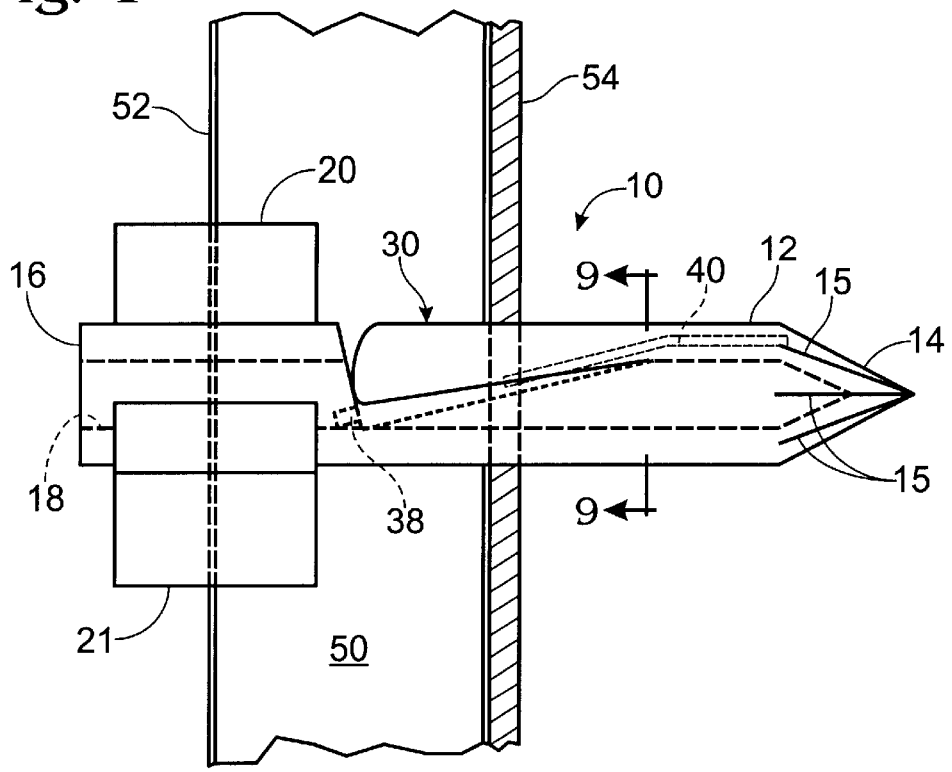
FIG. 1 is a side view in cross-section of the anchor of the present invention shown with the stud wedge mechanism in its retracted position.

The anchor 10 of the present invention includes a generally cylindrical body 12 having a conical leading (inner) end 14 and a trailing (outer) end 16.

A central threaded bore 18 extends from outer end 16 to its terminus adjacent cone-shaped inner end 14. The threads of bore 18 can be integral with the wall thereof where anchor 10 is made of metal or, where anchor 10 is made of plastic, can be formed by inserting an "ultra cert" threaded metal insert (not shown) to receive a selected threaded fastener. The threaded insert would have an opening corresponding to opening 24 (FIGS. 3 and 5) in body 12 cut therein. Where a threaded insert is used, it can be inserted into bore 18 after anchor body 12 is formed or molded into bore 18 during injection molding of anchor body 12 from plastic.

A top fin 20 and bottom fins 21 and 22 extend outwardly from the outer surface of cylindrical body 12 adjacent outer end 16.

Top fin 20 extends away from body 12 with its major plane intersecting the longitudinal axis of body 12 and being substantially perpendicular thereto. Top fin 20 is substantially rectangular with top and bottom edges parallel to the longitudinal axis of body 12 and side edges substantially perpendicular to the longitudinal axis of body 12.

The tops of the bases of bottom fins 21 and 22 extend away from anchor body 12 substantially at the mid-point of its circumference so that the tops of the bases of bottom fins 21 and 22 are located in the same plane, that plane being substantially perpendicular to the major plane passing through top fin 20. Bottom fins 21 and 22 extend outwardly from anchor body 12 at an angle, the outer portions of bottom fins 21 and 22 bending towards each other until they are substantially parallel to each other, as shown.

Although for purposes of compactness it is preferred to have bottom fins 21 and 22 angled toward each other as described above, fins 21 and 22 could be identical to top fin 20 with fins 20–22 being substantially evenly spaced apart around the circumference of anchor body 12. However, the further apart bottom fins 21 and 22 are spaced, the less support is provided against downwardly acting vertical forces caused by the object being anchored.

It is also possible to use more than three fins, but using too many fins would tend to cause the sheet rock to crumble.

Figure 3:
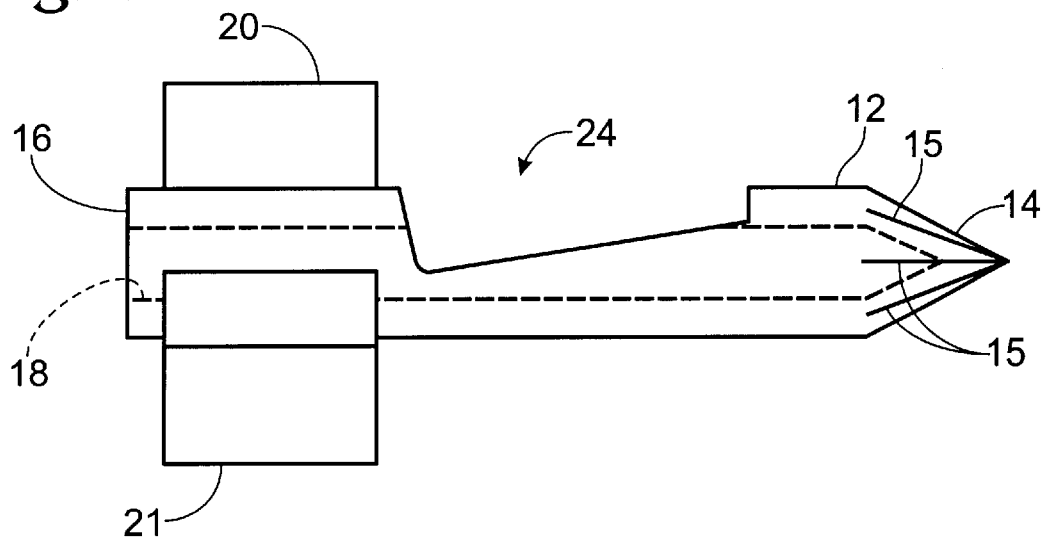
FIG. 3 is a side elevation in cross-section of the anchor of the present invention shown with the stud wedge removed.
Figure 4:
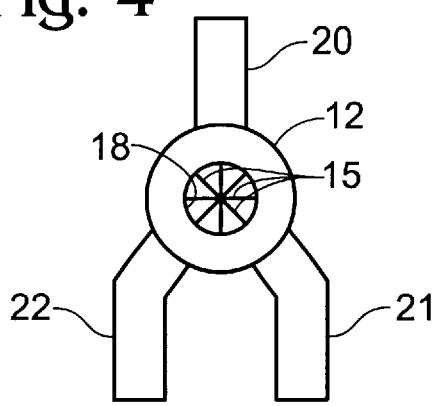
FIG. 4 is an end view of the trailing (outer) end of the anchor of the present invention.
Figure 5:
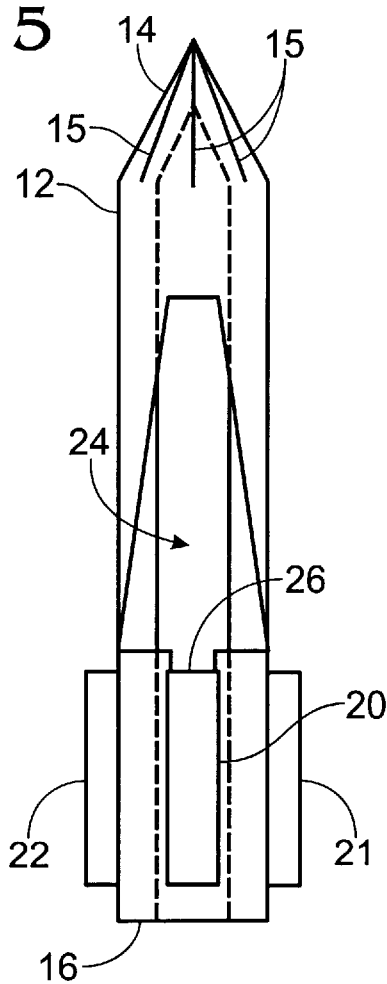
FIG. 5 is a top view of the anchor of the present invention with the stud wedge removed.

A sloping, substantially trapezoidal shaped opening 24 extends through the top wall of body 12, as best seen in FIGS. 3 and 5.

Cam-shaped stud wedge 30 is comprised of a main body portion 31 which, that is substantially flat along its bottom. Cross-sections of body 31 proceeding from inner end 32 to outer end 33 are segments of a circle whose arcs have the same radius as the anchor body 12. The lengths of the chords of such segments decrease from outer end 33 to inner end 32 and, subsequently, the rise of the arc above the chord at the outer end 33 is longer than the rise of the arc above the chord at inner end 32, the rise of the arc at outer end 33 being substantially the same as the radius of the anchor body 12 and the rise of the arc above the chord at inner end 32 being substantially the same as the thickness of the wall of anchor body 12. This can best be seen by reference to FIGS. 8 and 9.

In FIG. 8 outer end 33 is shown in relation to anchor body 12 (shown in phantom), and in FIG. 9 inner end 32 is shown in relation to anchor body 12 (shown in phantom).

Outer end 33 is cam-shaped for a purpose which will be discussed below.

Ledges 34 and 35 extend inwardly from the circumference of main body portion 31 of stud wedge 30, approximately 180 degrees apart and substantially perpendicular to the longitudinal axis thereof.

A rounded rib member 36 extends downwardly from the bottom of main body portion 31 adjacent the inner edges of ledges 34 and 35, and extends longitudinally and centrally along the bottom of main body portion 31 of stud wedge 30.

Figure 7:
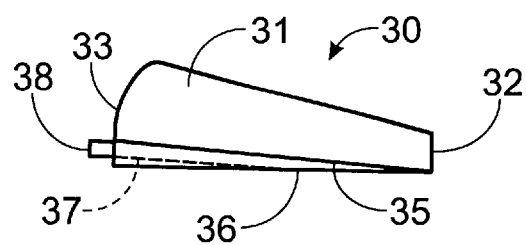
FIG. 7 is a side view of the stud wedge of the anchor of the present invention.

A semi-circular channel 37 is formed in the outer end of rib member 36 which runs about one quarter to one half the length thereof, tapering off and disappearing, as shown in FIG. 7. Channel 37 is substantially parallel to ledges 34 and 35. Channel 37 allows easier penetration of a cone-shaped fastener into bore 18 and, since it does not run the entire length of rib member 36, allows spring steel strip 40 to extend further into stud wedge 30 by being able to extend into rib member 36, as further discussed below.

Rib member 36 slopes upwardly toward main body portion 31 from cam-shaped outer end 33 to front end 32, substantially merging into main body portion 31 at front end 32, as best seen in FIGS. 6–9.

A stop tab 38 extends outwardly from the cam-shaped outer end 33 of stud wedge 30, as shown. Stop tab 38 is adapted to abut against the top of the hole drilled in metal stud wall 52 when stud wedge 30 is fully deployed, i.e., in the extended position shown in FIG. 2. The top of stop tab 38 is the arc of a circle having the same radius as the hole drilled in metal stud wall 52. Stop tab 38 passes through stop tab slot 26 (FIG. 5) in body 12 of anchor 10 as stud wedge 30 is deployed upwardly.

Figure 2:
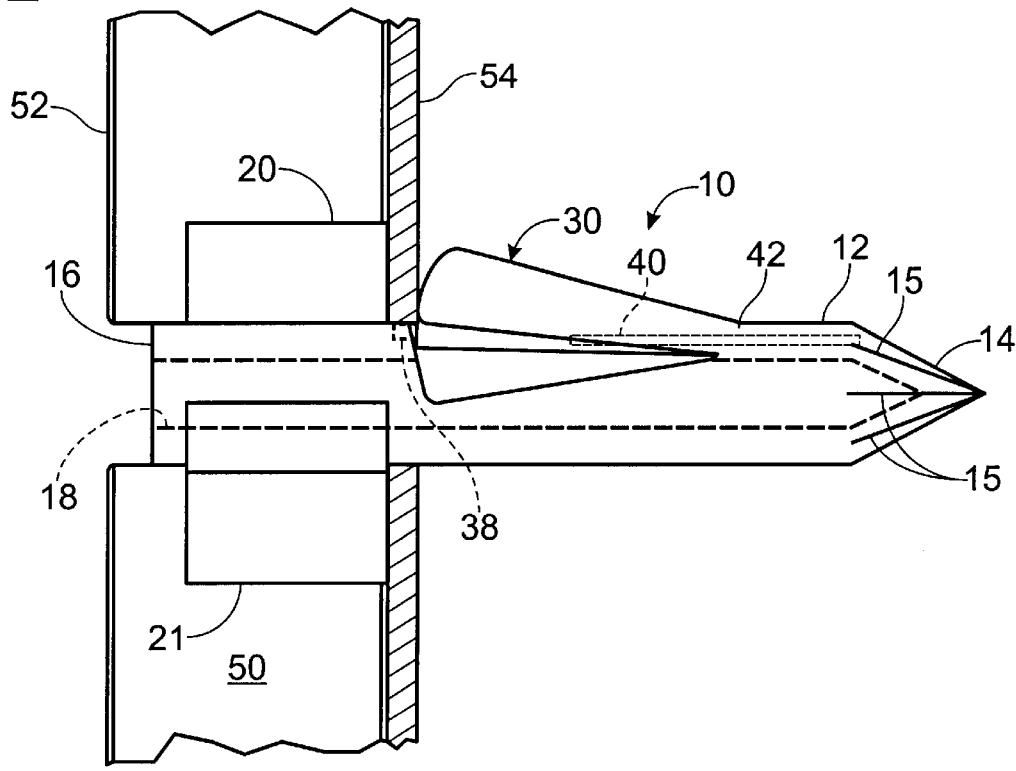
FIG. 2 is a side view in cross-section of the anchor of the present invention shown with the stud wedge in its deployed position.

A spring steel strip 40 is injection molded into the body 12 of anchor 10 in the area forward of front end 32 of stud wedge 30, and extends inwardly into the conical end 14 of anchor 10 and extends rearwardly into rib member 36, as can be seen in FIGS. 1 and 2. Anchor body 12 and stud wedge 30 are integral in the area of front end 32 of stud wedge 30, stud wedge 30 being injection molded in the extended position shown in FIG. 2, together with spring steel strip 40 in its unloaded (tension free), flat position shown in FIG. 2. Thus, spring steel strip 40 and the area adjacent front end 32 of stud wedge 30 together form a hinge 42. In its unloaded mode, hinge 42 holds stud wedge 30 in the raised position illustrated in FIG. 2.

Although FIGS. 3 and 5 illustrate the anchor body 12 with stud wedge 30 removed, and FIGS. 6 and 7 show the stud wedge 30 without anchor body 10, it is to be clearly understood that stud wedge 30 is integral with anchor body 10, and the illustration of anchor body 12 and stud wedge 30 as separate parts is solely for the purpose of more clearly describing the invention.

In operation, a metal stud having an outer wall 54 to which it is desired to attach anchor 10 is located. Then a pilot hole smaller than the diameter of anchor body 12 drilled through drywall 50 and the outer wall 54 of the metal stud. Next, a hole having substantially the diameter of anchor body 12 is drilled through sheet rock wall 50, the outer paper face 52 of which is shown in FIGS. 1 and 2, and through the outer wall 54 of the metal stud. It is desirable to drill the hole at a very slight upward angle without pushing the drill too hard to ensure that the burs on the backside of the metal stud wall 54 do not occur at the top of the hole.

The anchor 10 is then positioned with its outer end 16 against the outer paper face 52 of sheet rock wall 50, upper fin 20 being in a vertical position and with bore 18 aligned with the hole drilled in the sheet rock wall. Anchor 10 is then tapped just sufficient for fins 20–22 to make an impression on the outer paper face 52 of the sheet rock 50. A utility knife is then used to cut slits into the drywall paper where the fin impressions were left.

A suitable fastener, such as a #8 machine screw having 32 threads per inch, is screwed part way into bore 18 of anchor 10, and the anchor and fastener inserted into the drilled hole and tapped to drive the anchor 10 into the hole. As anchor body 12 moves into the hole, stud wedge 30 is depressed downward, as seen in FIG. 1, thereby bending and loading hinge 42.

The fastener and attached anchor 10 are driven into the hole until the inner vertical edges of fins 20–22 abut the outer face of metal stud wall 54 and the cam-shaped outer end 33 of stud wedge 30 has completely passed through the hole drilled in metal stud wall 54. At this point the downward acting pressure of the sheet rock and the opening in metal stud wall 54 acting against the upper surface of stud wedge 30 is released, thereby unloading hinge 42. The unloading of hinge 42 causes it to straighten out and force stud wedge 30 upwardly out of opening 24 in anchor body 12. In its raised position, as shown in FIG. 2, the cam-shaped outer end 33 of stud wedge 30 abuts the backside of metal stud wall 54, directly in line with top fin 20 located on the front side of metal stud wall 54.

As best seen in FIG. 2, the distance between the inner vertical edges of fins 20–22 which abut the front surface of metal stud wall 54 and the outer end 16 of anchor body 12 is selected to be less than the thickness of the sheetrock 50 so that outer end 16 is located inside the outer face 52 of the drywall. This is to allow the anchor 10 to be patched over after removal of the fastener in the event the anchor is no longer required.

The fastener is then screwed into anchor 10 until the head of the fastener abuts the item being secured to the wall and holds it tightly against the wall. The portion of the fastener located inside bore 18 of anchor 10 should preferably be at least the length of the anchor body 12 and cone-shaped end 14 to enhance the strength of the anchor body 12 by overcoming the weakness inherent in the anchor body 12 caused by opening 24. To ensure that the fastener has adequate length, slits 15 may be formed in cone-shaped inner end 14 of anchor 10, the slits 15 being adapted to split open the cone-shaped inner end 14 where a fastener longer than anchor 10 is used, all in a manner well known in the anchor art.

If for some reason stud wedge 30 has not fully deployed upwardly, the fastener, as it is being screwed into anchor 10, will urge stud wedge 30 further upward as the outer surface of the fastener comes into contact with the surface of channel 37 of rib 36, thereby ensuring that stud wedge 30 is securely wedged into place against the backside of metal stud wall 54. The fastener also prevents stud wedge 30 from being forced back into opening 24.

The cam shape of the outer end 33 of stud wedge 30 is configured and adapted to urge stud wedge 30 into tighter and tighter contact against the inner side of metal stud wall 52 the further stud wedge 30 is deployed upwardly. This result is obtained by having the upper surface of outer end 33 closer to inner end 32 than the lower surface of outer end 33. Upward movement of stud wedge 30 is terminated when the upper surface of stop tab 38 abuts against the upper part of the hole drilled in metal stud wall 54.

As can be seen in FIG. 2, the inner vertical edges of lower fins 21 and 22 abut the outer face of metal stud wall 54 to provide support for downwardly acting forces applied by the weight of whatever the fastener inserted into anchor 10 is holding.

The major plane of vertically disposed top fin 20 runs substantially through the vertical center of cam-shaped outer end 33 of stud wedge 30. The distance between the inner vertical edge of top fin 20 and cam-shaped outer end 33 of stud wedge 30 is selected to be, substantially, the thickness of metal stud wall 54.

Fins 20–22 are held in place by the surrounding drywall 50 and thereby prevent anchor body 12 from turning around its longitudinal axis while a fastener is being screwed into bore 18.

The fastener employed with the anchor 10 of the present invention can be any type of bolt or screw (such as a machine screw or wood screw), or other type of threaded fastener, the only caveats being that the threads of bore 18 must be adapted to mate with the threads of the selected fastener, the fastener must be at least as long as anchor 10, and the inner end of the fastener must be cone-shaped.

Anchor body 12, fins 20–22, stud wedge 30, and spring steel strip 40 are, preferably, formed as an integral unit by injection molding a rigid and strong polymeric material, such as a polycarbonate. However, anchor 10 can be made of metal.

It will be obvious to those having skill in the art that many changes may be made to the details of the above-described embodiments of this invention without departing from the underlying principles thereof. The scope of the present invention should, therefore, be determined only by the following claims.

The invention claimed is:

1. An anchor for use with metal studs comprising:
   a substantially cylindrical anchor body having a first, inner end, a second, outer end, said cylindrical anchor body including a top portion, a bottom portion, and side portions;
   a bore extending along the longitudinal axis of said anchor body from said outer end to said inner end and adapted to receive a threaded fastener;
   a plurality of fins extending from said anchor body adjacent said outer end thereof;
   an opening in the top portion of said anchor body communicating said bore with the exterior of said anchor body, said opening having a first, inner end and a second, outer end, said opening being located between said inner and outer ends of said anchor body; and
   a stud wedge member having a first, inner end and a second, outer end, said stud wedge member being integrally attached at its inner end to said anchor body at its juncture with said inner end of said opening in said anchor body to form a hinge means, said hinge means being adapted to urge said outer end of said stud wedge member above said opening when said hinge means is in an unloaded condition and to allow said stud wedge member to be retracted into said opening when said hinge means is in a loaded condition.

2. The anchor of claim 1 wherein said hinge means includes a spring steel strip located partially within said anchor body and partially within said stud wedge adjacent the juncture of said stud wedge to said anchor body, said spring steel strip being substantially straight and free of tension when said hinge means is in an unloaded condition and bent and under tension when said hinge means is in a loaded condition.

3. The anchor of claim 1 wherein said stud wedge has a shape adapted to fit snugly within and substantially close said opening in said anchor body when said hinge means is in a loaded condition.

4. The anchor of claim 1 wherein the peripheral shape of said stud wedge and the peripheral shape of said opening in said anchor body are trapezoids of substantially the same size.

5. The anchor of claim 1 wherein said second, outer end of said stud wedge has a cam shape adapted to provide that the upper portion of the surface of said second, outer end is closer to said first, inner end of said stud wedge than the lower portion of the surface thereof.

6. The anchor of claim 1 wherein said stud wedge has a main body portion that is substantially flat along its bottom and whose cross-sections from said first, inner end to said second, outer end are segments of a circle whose arcs have the same radius as said anchor body, the lengths of the chords of said segments decreasing from said outer end to said inner end of said main body portion with the rise of said arc above the chord at said outer end being substantially the same as said radius and the rise of said arc above the chord at said inner end being substantially the thickness of the wall of said anchor body.

7. The anchor of claim 6 wherein said stud wedge has a rib extending longitudinally from said bottom along the middle thereof from said first, inner end to said second, outer end of said stud wedge, said rib having a width less than the width of said bottom thereby forming a longitudinal ledge along both sides of said bottom, said ledges having a width substantially the same as the thickness of said anchor body.

8. The anchor of claim 7 wherein said rib has a channel formed therein whose cross-section is an arc of a circle, the radius of said arc being substantially the same as the radius of said threaded fastener.

9. The anchor of claim 8 including a stop tab extending rearwardly from the end of said rib adjacent said second, outer end of said stud wedge.

10. The anchor of claim 9 including a stop tab slot extending from said opening in said upper portion of said anchor body and adapted to receive said stop tab when said stud wedge is positioned within said opening.

11. The anchor of claim 1 wherein three fins extend from said anchor body adjacent its second, outer end.

12. The anchor of claim 11 wherein a first of said fins extends vertically upward from said top portion of said anchor body, a second and a third of said fins extending downwardly from opposite side portions of said anchor body.

13. The anchor of claim 12 wherein said first fin has an inner vertical edge that is spaced apart from said outer end of said stud wedge a distance substantially the same as the thickness of the wall of said metal stud.

14. The anchor of claim 1 wherein said anchor body has a conical first, inner end.

15. The anchor of claim 14 including slits in said conical first, inner end of said anchor body adapted to split open said first, inner end when said fastener is screwed thereagainst and allow said fastener to pass through said split open inner end.

* * * * *